F. J. FELDT.
CORRUGATED CULVERT.
APPLICATION FILED AUG. 29, 1910.
977,944.
Patented Dec. 6, 1910.
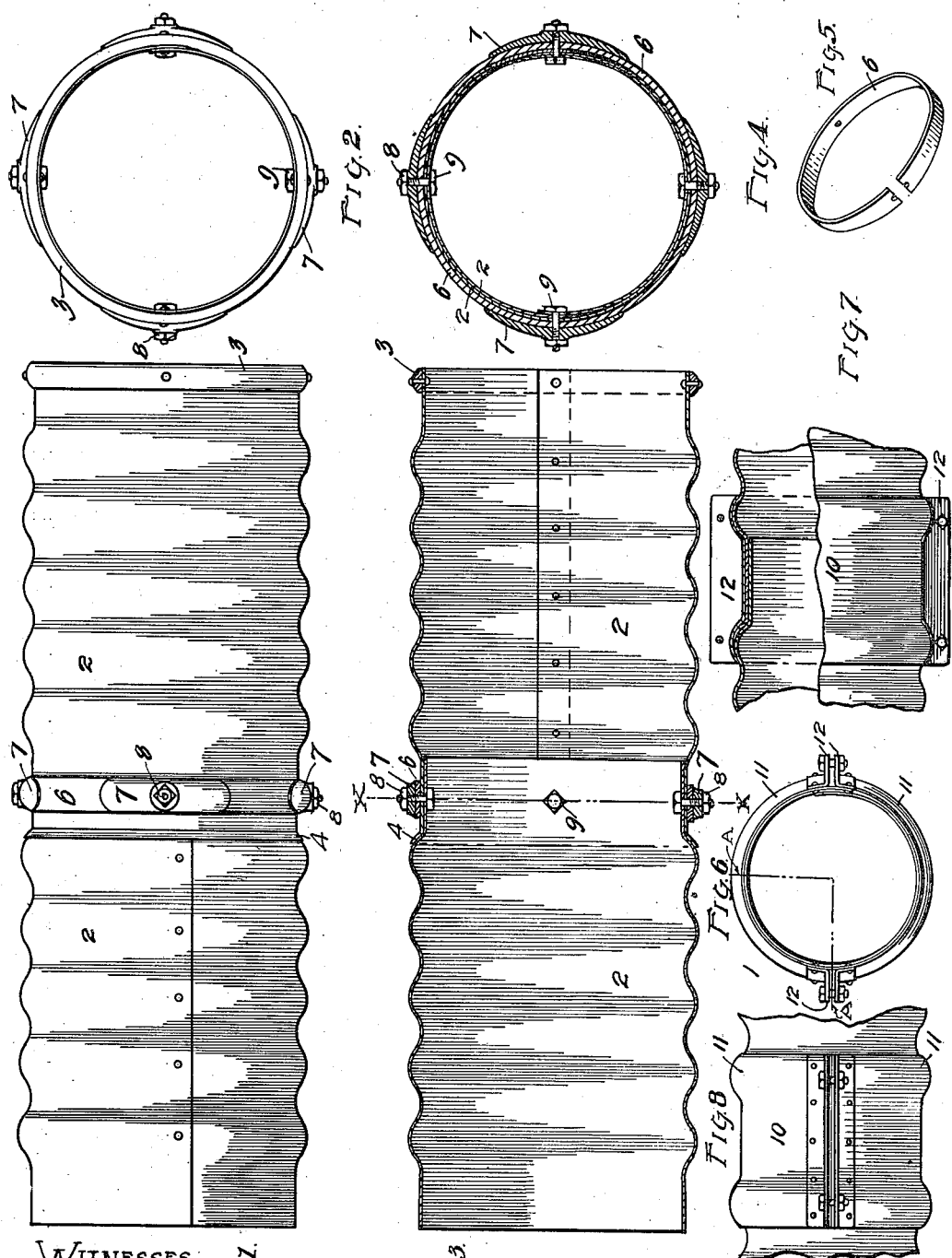

UNITED STATES PATENT OFFICE.

FERDINAND J. FELDT, OF PEORIA, ILLINOIS.

CORRUGATED CULVERT.

977,944.  Specification of Letters Patent.  Patented Dec. 6, 1910.

Application filed August 29, 1910. Serial No. 579,413.

*To all whom it may concern:*

Be it known that I, FERDINAND J. FELDT, a citizen of the United States, residing at Peoria, in the county of Peoria and State of Illinois, have invented certain new and useful Improvements in Corrugated Culverts, of which the following is a specification.

My invention relates to sheet metal culverts.

My object is to provide a culvert adapted to withstand readily the circumferential pressure attending their use and likewise to connect the sections in a manner to stand the lateral pressure that in use tends and does force the sections out of line, making the connected culvert sag at points of its length, leaving pockets, within which water will stand, which is detrimental thereto.

In culvert structure, in use now, breaking or disconnection of joints of culvert sections frequently occurs and when so broken and disconnected, the movement of containing embankment in settling tends and does eject the culvert endwise. It is to overcome this frequent disunion of sections and to stiffen the combined culvert lengthwise, that I have developed the section connecting means of my present invention.

Referring to the drawings: Figure 1 is a plan view of a longitudinal section of a culvert, showing the manner of joining sections together. Fig. 2 is an end view of the culvert. Fig. 3 is a longitudinal sectional view, illustrating detail manner of making the connections. Fig. 4 is a cross section on the line X—X of Fig. 3. Fig. 5 is a detail perspective view, showing a coupling band. Fig. 6 shows a clamp for uniting culvert sections. Fig. 7 is a sectional view, showing the manner of applying the clamp Fig. 8 shows the clamp applied.

Referring to the drawing, 2 are circumferentially corrugated culvert sections; 3 is a reinforcing metal ring, adapted to protect the outer ends of the terminal sections when laid. Each section 2 is formed at its ends in size and shape, one to enter and the other to receive the adjacent section in the manner shown in Fig. 3, the outer overlapping end 4, flaring outwardly to form a stop and to extend the joint. The sections 2 being passed one upon another, the joints are locked by means of the stiffening and compression band 6, which is formed in ring shape, but left open so as to be drawn together or expanded to fit perfectly and closely over the joints which are not always of a uniform circumference. The band is perforated, as shown, and one of the perforations is formed ½ in. each end of the band, so that as the ends are drawn together they make up a complete opening adapted to surround a bolt; 7 are stiffener plates, which are simply washers, elongated and shaped to bear over and extend along the band 6, as a stiffener for the joint and a bearing for the nuts 8 carried on bolts 9, which serve to unite the band 6 to the connected ends of section 2.

In applying my section joining means, the meeting sections are engaged as in Fig. 3, the ends telescoping some distance, thus strengthening the joint against lateral strain. The band 6, being first slipped about the outside end portion, then the stiffener plates 7 and bolts 9 are applied and when the parts are drawn together, the band 6 will be drawn together until it fits snug around the culvert joint.

The culvert sections 2, may be joined at the place they are to be used, but it is a common practice to unite them in 20 ft. lengths at the factories where they are built. When it is desired to use lengths greater than 20 ft., the long sections may be united by means of outside sectional face clamps, such as I have shown herein in Fig. 6, 7 and 8, and referred to generally as 10. This clamp is made in two sections as 11, shaped to conform to so much of the culvert surface as it is designed to embrace, and it is designed to overlap at least one corrugation of each adjacent section, as shown in the figures; 12 are flanged parts secured to clamp section 11 and adapted to be secured together by means of bolts, as shown. Any form of clamp may be used that will serve its purpose.

What I claim is—

1. In combination with short corrugated tubular sections, the meeting ends extended some distance from the terminal corrugations and telescoping with each other, of a compressible band, stiffener plates, and means for securing the parts together in the relation substantially as shown.

2. The combination with short circumferentially corrugated metal sections, provided with telescoping longitudinally extending straight terminal ends and means for locking the terminal ends together, comprising a perforated band, its ends disunited, elongated perforated stiffener plates, conforming to the shape of the band and bolts and nuts or the like for securing the parts together in the relation shown and described.

In testimony whereof I affix my signature in presence of two witnesses.

FERDINAND J. FELDT.

Witnesses:
A. B. FINK,
W. V. TEFFT.